United States Patent [19]

Landfors et al.

[11] Patent Number: 5,792,315

[45] Date of Patent: Aug. 11, 1998

[54] PURIFYING AQUEOUS EFFLUENT FROM A PULP MILL USING ELECTRO CHEMICAL MEMBRANE DEVICE

[75] Inventors: Johan Landfors; Christin Persson, both of Sundsvall, Sweden

[73] Assignee: Eka Chemicals AB, 80 Bohus, Sweden

[21] Appl. No.: 602,556

[22] Filed: Feb. 20, 1996

Related U.S. Application Data

[60] Provisional application No. 60/000,140, Jun. 12, 1965.

[30] Foreign Application Priority Data

Feb. 27, 1995 [SE] Sweden .................. 9500732-4

[51] Int. Cl.$^6$ .................. D21C 11/00

[52] U.S. Cl. ............. 162/29; 162/50; 162/DIG. 8; 204/529; 205/749

[58] Field of Search .................. 162/29, 30.11, 162/50, DIG. 8; 204/529, 634; 210/748; 205/503, 510, 464, 618, 749

[56] References Cited

U.S. PATENT DOCUMENTS

| | | | |
|---|---|---|---|
| 5,401,362 | 3/1995 | Lindberg | 162/37 |
| 5,547,542 | 8/1996 | Landfors | 162/29 |

FOREIGN PATENT DOCUMENTS

| | | |
|---|---|---|
| 0 416 312 | 11/1994 | European Pat. Off. . |
| 0 653 511 | 5/1995 | European Pat. Off. . |
| WO 94/23122 | 10/1994 | WIPO . |
| WO 96/11299 | 4/1996 | WIPO . |

OTHER PUBLICATIONS

Gerald E. Maples, "BFR™: A New Process Toward Bleach Plant Closure", Tappi Journal, vol. 77, No. 11, Nov. 1994.

European Search Report, dated Jan. 14, 1998.

Electrodialysis in Advanced Waste Water Treatmwnt, *Desalination*, 24 (1978), pp. 129–139.

Environmental Oriented Electrochemistry, Studies in environmental science; 59, pp. 495–533, Elsevier 1994.

Effluent Free electrolytic Regeneration of Ion–Exchange Resins, Strathmann and K. Kock, pp. 145–168.

*Primary Examiner*—Stanley S. Silverman
*Assistant Examiner*—Dean T. Nguyen
*Attorney, Agent, or Firm*—Ralph J. Mancini

[57] ABSTRACT

This invention is related to a process for producing pulp from a cellulosic starting material, wherein an aqueous process effluent is purified from metal impurity cations. This process comprises that the effluent is purified by an electrochemical membrane treatment in an electrochemical membrane device comprising a unit cell through which an electric current is passed between an anode side and a cathode side of said cell, said cell comprising at least two ion permeable membranes forming between them at least one compartment, said effluent being fed into an effluent feed compartment in said cell, in which the effluent is purified by removing with the electric current metal impurity cations from the effluent through a cation selective membrane on the cathode side of said compartment, and withdrawing from said compartment the purified effluent. The purified effluent may be recirculated to the pulp mill process, e.g. as washing water.

12 Claims, 2 Drawing Sheets

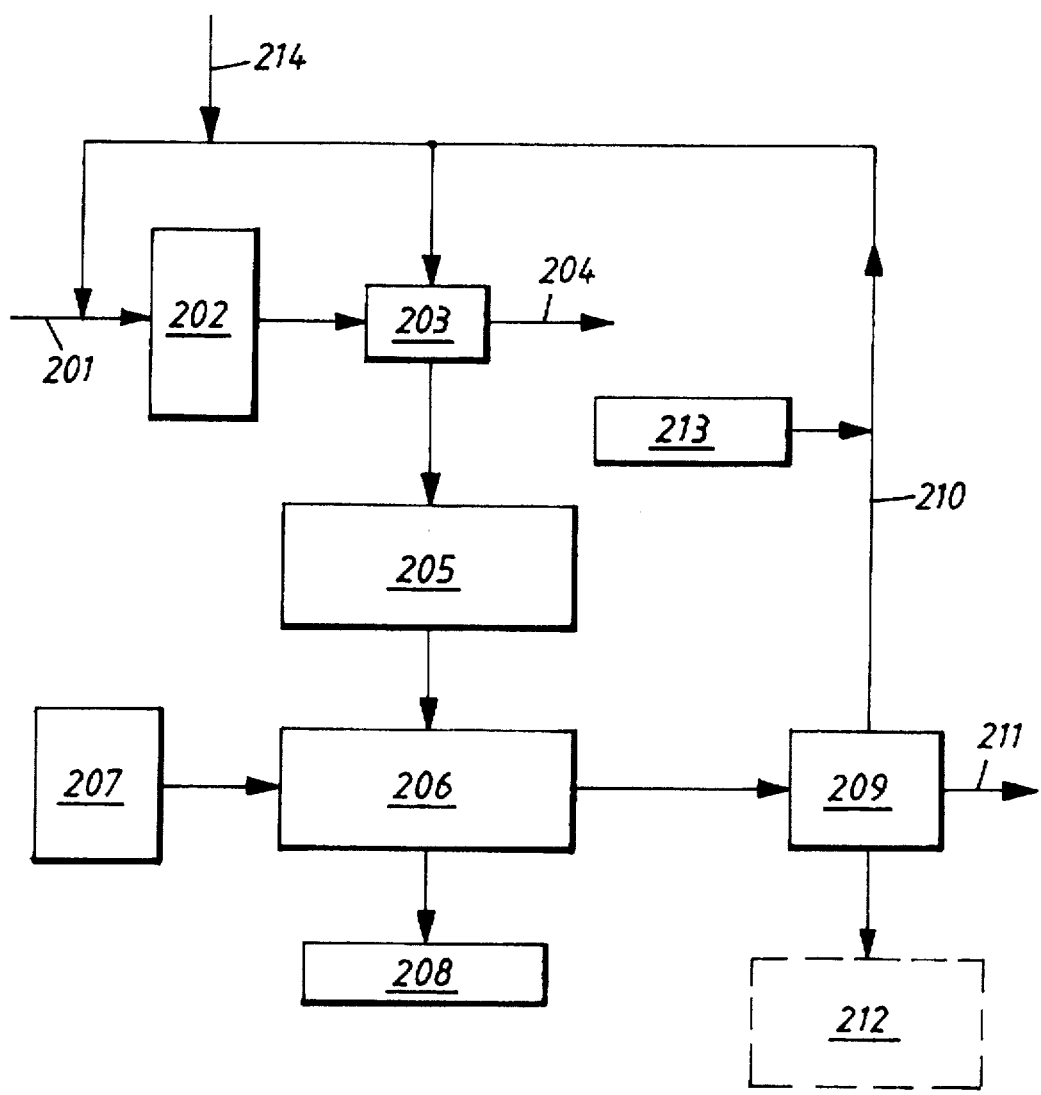

PURIFYING AQUEOUS EFFLUENT FROM A PULP MILL USING ELECTRO CHEMICAL MEMBRANE DEVICE

This application claims the benefit of U.S. Provisional Application 60/000,140, filed Jun. 12, 1995.

BACKGROUND OF THE INVENTION

This invention is related to a process for producing pulp from a cellulosic raw material wherein an aqueous process effluent is purified from metal impurity cations and optionally recycled to the pulp production process. The invention is especially related to the removal of metals from liquids obtained in pulp mill operations, such as bleaching operations, in the following also called effluent streams, such as washing effluent streams from bleaching operations. The invention can be used for treating liquids from e.g. softwood and hardwood pulp mill operations, and examples of such bleaching methods and operations are mentioned below and comprise those well-known to those skilled in the pulp bleaching art.

Metal ions present in process and washing liquids in pulp mills, and especially in the bleaching treatment of pulp, often cause problems and should preferably be removed. Thus, metal ions are dissolved from the pulp into the water used for diluting and washing in the various bleach steps, and may also be deliberately added for improving certain process steps. Metals influence the bleaching process in various ways, e.g. by forming precipitates when exceeding the solubility limit, and by increasing the decomposition of the bleach chemicals, such as hydrogen peroxide and ozone.

Furthermore, it is becoming increasingly important to recirculate to the largest possible extent the effluent streams formed in the pulp mill, such as bleaching effluents, to various process steps in the pulp mill, such as the bleaching step. However, such recirculation tends to contribute to the accumulation of metal salts in the various process streams, such as the water used in the bleaching treatment, and it is therefore necessary to separate the accumulated metal salts or metal ions from the streams which are to be recirculated in the pulp mill process, such as the bleaching step.

Various methods have been tried for achieving extensive recirculation of aqueous streams in the pulping process, such as the process disclosed in WO-A1-9423122, which comprises treating metal ion containing process water from a pulp bleaching process with an alkaline liquid for precipitating metal ions as compounds with low solubility, which are separated from the water. Said previously known methods have, however, disadvantages and have not led to a commercially completely satisfactory process which permits a "closed" pulp mill operation.

BRIEF SUMMARY OF THE INVENTION

According to this invention it is possible to solve the above mentioned and other problems in a process for producing pulp from a cellulosic starting material, wherein an aqueous process liquid, here called effluent, is purified from metal impurity cations and optionally recycled to the pulp production process. This process is characterized in that the effluent is purified by an electrochemical membrane treatment in an electrochemical membrane device, preferably in an electrodialysis device, comprising a unit cell through which an electric current is passed between an anode side and a cathode side of said cell. Said cell comprises at least two ion permeable membranes, forming between them at least one effluent compartment, wherein said cell comprises, counted in the direction from the cathode side of the cell towards the anode side, a first cation selective membrane and a second ion permeable membrane, said second membrane being a cation selective membrane or a non-ion selective porous polymeric membrane, wherein the effluent feed compartment is formed between said first and second membranes, wherein the process comprises the step of feeding the effluent into the effluent feed compartment in said cell, purifying the effluent by removing with the electric current metal impurity cations from the effluent through a cation selective membrane on the cathode side of said compartment, withdrawing from said compartment the purified effluent, and feeding a solution comprising cations into the formed compartment on the anode side of the effluent feed compartment, transporting the cations by the electric current through the second membrane as a substitute for the metal impurity cations removed from the effluent in the effluent feed compartment.

The purified effluent can optionally be recycled to the pulp production process, optionally after further treatments, such as pH adjustment, or used for other purposes or be disposed of, e.g. for preventing unacceptable accumulation of anions, such as anions derived from the pulp or pulp raw materials or deliberately added in the process. The expression "metal impurity cations" includes also per se valuable metal cations which it is for various reasons desired to remove from the effluent liquid, optionally for recovery as a valuable material.

Devices which are suitable for carrying out the purifying treatment in the process of the invention and the use of said devices are known to those skilled in the art, especially the electrodialysis art and technology, and are disclosed e.g. in R. W. Baker et al., "Membrane Separation Systems", Noyes Data Corporation, 1991, and H. Strathmann, "Environmental oriented electrochemistry", Studies in environmental science; 59, p. 495–533, Elsevier 1994, the disclosures of which are included by reference.

As regards pulp bleaching methods in connection with which the process of this invention can be used, reference can be made e.g. to "Bleaching technology for chemical and mechanical pulps", Miller Freeman, Inc., 1991. Examples of such bleaching operations are bleaching comprising treatment of pulp with one or more of such bleaching chemicals as chlorine, chlorine dioxide, oxygen, ozone, peroxides, e.g. hydrogen peroxide, peracetic acid, other oxidizing acids, enzymes, (metal) complex forming agents, e.g. EDTA, DTPA, and other per se known bleaching chemicals, and also bleach sequences in which metal cations are deliberately added to process liquors before, during or after the bleaching and/or washing treatments.

Other publications disclosing electrodialysis and similar processes are e.g. EP 90015300.7 and "Electrodialysis in advanced waste water treatment", Desalination, 24 (1978), 129–139, the disclosure of which is included herein by reference.

No such previously suggested processes have, however, been regarded as suitable for treating pulp mill liquors, and especially washing liquors from pulp bleaching processes or for integrating in closed pulp mill operations.

Examples of devices which can be used for carrying out the process according to the invention are indicated in FIGS. 1 and 2 of the enclosed drawings.

BRIEF DESCRIPTION OF THE DRAWINGS

FIG. 2 is a flow sheet illustrating an exemplary for the treating of bleach plant effluents from a pulp mill according to the present invention.

DETAILED DESCRIPTION OF THE DRAWINGS

Figure 1:
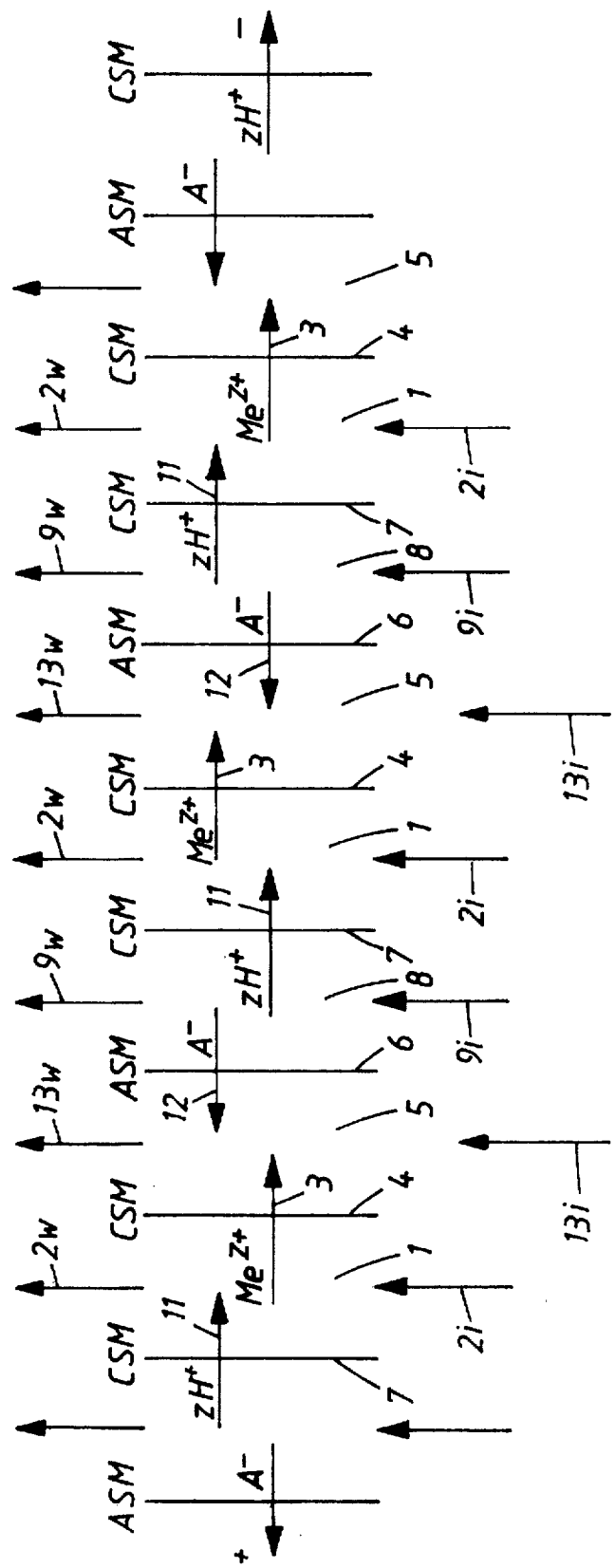
FIG. 1 shows an example of an electrodialysis stack.

An electrochemical membrane device, suitably an electrodialysis stack, which can be used in the process of this invention is shown schematically in FIG. 1. The preferred electrodialysis stack comprises, between an anode and a cathode arranged at the opposite ends of said stack, a repeated sequence of two cation selective membranes (also called CSM for Cation Selective Membrane) and one anion selective membrane (also called ASM for Anion Selective Membrane), which together form a unit cell. Into the effluent feed compartment 1 formed between each pair of CSM membranes flows the impure effluent input 2$i$, containing metal impurity cations ($Me^{z+}$) and from said compartment the purified effluent 2$w$ is withdrawn, e.g. for recirculation for further use. Metal cations 3 are removed from the effluent feed compartment 1 by transport with the electric current maintained between the anode and the cathode, through the CSM 4 to a metal salt compartment 5 formed between the CSM 4 and the adjacent ASM 6 of the adjacent unit cell on the cathode side. The ASM 6 of the unit cell and the adjacent CSM 7 form between them a compartment 8, called substitute cation compartment, into which is fed a substitute cation containing solution 9$i$, in the example shown on the figure an acid $H_nA$, where n is the valency of the anion A, and from which is withdrawn a depleted acid solution 9$w$. The substitute cations, in this case protons, pass 11 through the CSM 7 to the effluent feed compartment 1 and substitute the metal ions which pass 3 through the CSM 4 to the metal salt compartment 5. The anions A pass 12 through the ASM 6 and form in the adjacent compartment 5 together with the metal ions 3 the metal salt solution which is withdrawn 13$w$ from compartment 5. The withdrawn metal salt solution 13$w$ can be recirculated back and added to 13$i$ the metal salt compartment 5 in the same cell or to a cell connected in series, optionally after dilution with water. Furthermore, according to an alternative the cation selective membranes 7 can be substituted with non-ion selective porous polymeric membranes, e.g. of polyolefin, such as polyethylene.

FIG. 2 is an example of a flow sheet illustrating the use of the invention for treating bleach washing effluents from a pulp mill. Pulp 201 is fed into a bleach plant 202, such as a bleaching tower, and from there into a washing filter 203, from which the bleached pulp is withdrawn 204. The wash water effluent is fed to a filter 205 for removing fibres and particles and is then fed to a preferred electrodialysis plant 206 comprising an electrodialysis (ED) stack device, e.g. of the type indicated in FIG. 1. A cation containing liquid, e.g. an acid, such as sulphuric acid, hydrochloric acid, etc. is fed from a source 207 to the plant 206 as a source for substitute cations, which substitute the cations in the impure effluent, which should be removed in the ED device. Anolyte and catholyte liquids are also supplied to the ED device from sources not shown in the figure, or alternatively the substitute cation source can be used for said purpose, especially if it is an acid. A concentrated metal salt solution 208 is withdrawn from the device 206 and can be reused or disposed of. The effluent after treatment by electrodialysis is withdrawn as purified washing water 209 and recirculated 210 in the bleaching process, withdrawn 211 for use in other parts of the pulp mill or for other purposes, or partly bleeded off 212 for preventing severe build-up of anions, especially such anions produced from the pulp. The purified effluent recirculated in the bleaching process can optionally be subjected to a pH adjustment, e.g. by addition 213 of base, such as NaOH, or acid to the purified effluent. The recirculation of the effluent can be performed e.g. to the bleaching plant 202 with the pulp which is subjected to the bleaching treatment and/or to the washing 203 of the bleached pulp. The recirculated effluent can also be replenished or supplemented with additives, such as bleach process chemicals, such as those mentioned above, e.g. complexing agents, and with fresh water, etc., as is indicated in the figure with the arrow 214.

According to a usually preferred embodiment of the invention, which can be exemplified with the device disclosed on FIG. 1, the process comprises that the effluent is purified in a device comprising unit cells comprising at least three ion permeable membranes, which, counted in the direction from the cathode side of a unit cell towards the anode side, comprise a first cation selective membrane, a second ion permeable membrane, which is a cation sective membrane or a non-ion selective porous polymeric membrane, preferably of polyolefin, especially polyethylene, and a third, anion selective membrane, wherein the effluent feed compartment is formed between the first and the second of said membranes, and a further compartment, also called substitute cation compartment, is formed between the second and third of said membranes. Into the substitute cation compartment is fed a solution comprising cations, which are transported by the electric current through the second membrane as a substitute for the metal impurity cations removed from the effluent in the effluent feed compartment. Said substitute cations may be metal cations, such as alkali metal, e.g. sodium, cations, and especially protons (hydrogen cations, hydronium ions), e.g. derived from an organic or inorganic acid, e.g. hydrochloric or sulphuric acids. For charge equivalence a corresponding quantity of anions (anion equivalents) are transported by the electric current from the substitute cation compartment through said third, anion selective membrane. Said anions are in the embodiment shown on FIG. 1 transported to a compartment formed between said anion selective membrane and the adjacent cation selective membrane (first membrane) of the adjacent (on the anode side) unit cell, from which compartment the metal salt solution formed by the impurity metal ions and said anions is withdrawn.

The process is not restricted to using a device with unit cells comprising only the set of three membranes mentioned above. Thus, further membranes can be included together with or as a substitute for these three membranes, but normally there is a cation selective membrane on the cathode side of the effluent feed compartment for removing impurity cation from the effluent. Such membranes which may be used as a substitute for or together with the membranes mentioned above may include monovalent cation selective and polyvalent cation selective membranes.

The process of the invention can also be improved by using a cell in which the effluent feed compartment, into which the effluent is fed, is at least partly, e.g. to at least 50% of the volume, or optionally completely filled with a cation exchange material, e.g. an organic polymeric such material, which improves the preferred electrodialysis process, e.g. the degree and/or speed of removal of the metal impurity cations from the effluent. The use of electrodialysis for regenerating ion exchange materials is discussed in Strathmann, H. and Kock, K. in an article with the title "Effluent free regeneration of ion-exchange resins" the disclosure of which is included herein by reference.

The operation of the electrochemical process of the invention may also be improved by periodically reversing the polarity of the electrodes of the electrochemical cell, i.e. the anode is made cathode and vice versa, and simultaneously shifting (interchanging) the flow paths of the metal impurity salt solution and the substitute cation solution through the compartments adjacent and on opposite sides of the effluent feed compartment. In this way a cleaning effect on the membranes is obtained, and depositions of organic materials on the membranes can be removed when the direction of the current is reversed.

The process may also be improved by performing a concentration treatment on the effluent, prior to subjecting the effluent to the electrochemical treatment, by a suitable concentration method, e.g. reversed osmosis and especially evaporation of a part of the water in the effluent. The reduction of the volume may be performed to a remaining volume of suitably at most about 60%, more suitably at most about 40%, preferably at most about 20% or most preferably about 10% of the original volume and with a corresponding increase of the concentration of dissolved materials, especially metal ions. The increased concentration of the metal ions in the effluent may e.g. make it possible to increase the current density in the electrochemical process.

The solution of metal salts removed from the effluent in the electrochemical process may be subjected to further treatments, especially for precipitating metal compounds for disposal or for recovery. Such treatments include treatments with materials comprising at least one material selected from the group consisting of hydroxides, carbonates and sulfides. Preferably products from the pulp process are used for said purpose, such as green liquor, white liquor, solid alkalic sludge, green liquor sludge, lime mud or other solid or liquid products which can cause precipitation of metals in the withdrawn salt solution.

The invention can with advantage be used for treating washing water which has been acidified for removing metals, as may be the case e.g. in ozone bleaching. If such a process is closed, problems will be obtained with too high contents of the acid anion, usually sulphate, in the pulp mill operation. With the process of this invention the acid washing water effluent can be purified from metal ions and recirculated for removal of metal ions from the pulp. The process of the invention is also highly suited for use with bleaching processes with pretreatments with complexing agents, such as EDTA, DTPA and basically all kinds of such complexing agents used for treating the pulp. Thus, removal of metal ions can be performed also in the presence of commonly used complexing agents, such as DPTA and EDTA, from which the metal ions can be separated efficiently by the process of the invention with the complexing agents remaining in the purified effluent withdrawn from the electrodialysis cell.

An acid effluent may, for instance, have the following composition: 0–2.5 g/l $Na^+$, 0–2 g/l $Cl^-$, 0–0.5 g/l $ClO_3^-$, as well as other anions, such as $SO_4^{2-}$. An alkaline effluent may, for instance, have the following composition: 0–5 g/l $Na^+$, 0–2 g/l $Cl^-$, 0–0.5 g/l $ClO_3^-$, as well as other anions, such as $OH^-$, $HCO_3^{2-}$, $CO_3^{2-}$ and $SO_4^{2-}$. In addition, there can be a great number of metal ions present, cations, such as Ca, Fe, Mg, P, Si, Mn, Zn, Mo<1% by weight.

The invention is not restricted to the embodiments described above. The figures in % and parts given in the description and the appended claims are all by weight, unless otherwise stated.

EXAMPLES

A series of test experiments were performed in a test cell arrangement comprising a micro flow cell divided by two membranes into a central compartment for receiving the tested effluent, surrounded on opposite sides by an anode compartment and a cathode compartment receiving anolyte and catholyte resp. The membrane arrangements were a cation selective membrane (Nafion 324®) on the cathode side of the central cell compartment receiving the effluent, and the same cation selective membrane or a porous polyethylene separator on the anode side of this compartment. The effluent fluids used were effluents from pulp bleaching operations, comprising D (chlorine dioxide), or E (alkali hydroxide) bleach process wash water from a kraft mill process, or mixtures of 3 parts such D and 1 part such E wash water evaporated to reduce the volume down to 10% of the original volume of the wash water effluent, or Q (complexing agent) bleach wash water. 0,5M sulphuric acid was used as anolyte and catholyte. Uniform flows of about 600 ml/min through each of the cell compartments were maintained during the test period. The start and end values of the contents of the metal cations of Na, Mg, Ca, Mn, Zn and Ba in mg/l at the total charge quantities q in kAs/l, the reduction of the ion concentration of each ion species at each experiment in per cent and the current densities in kA/square metre used are stated in Table I below. In the table typical results obtained in said tests are given as examples. In these tests the following effluents 1 to 4 were used:

1. D (chlorine dioxide) ($D_0$) bleach process wash water from the bleaching of softwood kraft pulp.
2. E (alkali hydroxide) ($E_1$) bleach process wash water from the bleaching of softwood kraft pulp.
3. Mixtures of 3 parts of D and 1 part of E bleach process wash waters from the bleaching of hardwood kraft pulp evaporated until 10% residual volume remained.
4. Q-filtrates produced during laboratory bleaching of hardwood kraft pulp using metal ion complexing agents, especially EDTA and DTPA.

For effluents 1 and 4 the central cell compartment embodiment with two cation selective membranes (CSM) and for effluents 2 and 3 the embodiment with a cation selective membrane (CSM) and a porous polyethylene membrane (POR) was used as is indicated in Table I below.

TABLE I

| | Test results from electrodialysis of effluents 1 to 4. | | | | | | | |
|---|---|---|---|---|---|---|---|---|
| Effl. | 1 | | 2 | | 3 | | 4 | |
| Compartm. config. | +CSM | CSM− | +POR | CSM− | +POR | CSM− | +CSM | CSM− |
| cd kA/m² | 0,6 | | 0,3 | | 0,3 | | 0,15 | |
| q kAs/l | 0 | 35,0 | 0 | 6,77 | 0 | 16,6 | 0 | 4,75 |
| Na | 278 | 3,63 | 1760 | 531 | 5770 | 3370 | 195 | 5,83 |

TABLE I-continued

Test results from electrodialysis of effluents 1 to 4.

| Effl. | 1 | | 2 | | 3 | | 4 | |
|---|---|---|---|---|---|---|---|---|
| Mg | 99% | | 78% | | 44% | | 97% | |
|    | 12,6 | 0,23 | 2,9 | 1,1 | 140 | 37 | 4,90 | 0,08 |
|    | 99% | | 65% | | 73% | | 98% | |
| Ca | 41 | 1,34 | 16 | 6,4 | 361 | 261 | 43,1 | 0,55 |
|    | 98% | | 74% | | 22% | | 99% | |
| Mn | 1,37 | 0,04 | 0,3 | 0,1 | 16 | <0,02 | 8,34 | 0,22 |
|    | 98% | | 70% | | >98% | | 97% | |
| Zn | 0,29 | <0,04 | 0,1 | 0,2 | 3 | 2 | 1,91 | 0,51 |
|    | >90% | | — | | 35% | | 73% | |
| Ba | 0,08 | <0,02 | 0,1 | 0,03 | 0,52 | <0,01 | 0,15 | 0,02 |
|    | >80% | | 79% | | >98% | | 97% | |

The test results in the table show that highly satisfactory results can be obtained, which permit substantial improvements of pulp production processes and water conservation in connection therewith as well as efficient use and recovery of valuable constituents and disposal of rejected materials.

We claim:

1. A process for purifying aqueous effluent from a process for producing pulp from a cellulosic starting material, which comprises removing metal impurity cations from said aqueous process effluent said process comprising purifying the effluent by an electrochemical membrane device comprising a unit cell through which an electric current is passed between an anode side and a cathode side of said cell, said cell comprising at least two ion permeable membranes, forming between them at least one effluent compartment, wherein said cell comprises, counted in the direction from the cathode side of the cell towards the anode side, a first cation selective membrane and a second ion permeable membrane, said second membrane being a cation selective membrane or a non-ion selective porous polymeric membrane, wherein the effluent feed compartment is formed between said first and second membranes, wherein the process comprises feeding the effluent into the effluent feed compartment in said cell purifying the effluent by removing with the electric current metal impurity cations from the effluent through a cation selective membrane on the cathode side of said compartment, withdrawing from said compartment the purified effluent, and feeding a solution comprising cations into the formed compartment on the anode side of the effluent feed compartment, transporting the cations by the electric current through the second membrane as a substitute for the metal impurity cations removed from the effluent in the effluent feed compartment.

2. The process of claim 1 wherein the purified effluent is recycled to the pulp mill.

3. The process of claim 1 wherein the unit cell comprises at least three ion permeable membranes, which, counted in the direction from the cathode side of the cell towards the anode side comprises a first, cation selective membrane, a second ion permeable membrane, which is a cation selective membrane or a non-ion selective porous polymeric membrane, and a third, anion selective membrane, wherein the effluent feed compartment is formed between said first and second membranes, and a substitute cation compartment is formed between the second and third of said membranes, into which is fed a solution comprising cations, which are transported by the electric current through the second membrane as a substitute for the metal impurity cations removed from the effluent in the effluent feed compartment, and wherein a corresponding quantity of anions are transported by the electric current from the substitute cation compartment through said third, anion selective membrane.

4. The process of claim 3 wherein the electrochemical membrane treatment is performed in an electrodialysis stack device comprising a stack of electrodialysis unit cells formed by a repeating sequence of ion permeable membranes and with an anode and cathode resp. arranged at the opposite ends of the stack, between which the electric current is passed through the unit cells, and in which a metal impurity salt solution is withdrawn from a metal impurity salt compartment formed between the third, anion selective membrane in one unit cell and the first, cation selective membrane in the adjacent unit cell.

5. The process of claim 1 wherein the substitute cations are protons supplied from an acid solution or alkali metal ions in an aqueous solution, which is fed into the substitute cation compartment on the anode side of and adjacent the effluent feed compartment.

6. The process of claim 1 wherein the effluent feed compartment, into which the effluent is fed, is at least partly filled with a cation exchange material.

7. The process of claim 1 wherein the polarity of the electrodes of the electrochemical cell is periodically reversed and the flow paths of the metal impurity salt solution and the substitute cation solution through the compartments adjacent and on opposite sides of the effluent feed compartment are simultaneously shifted.

8. The process of claim 1 wherein the effluent contains metal ions and is selected from pulp bleaching and washing treatments based on the use of at least one of chlorine dioxide, hydrogen perioxide, ozone, peracetic acid, other oxidizing acids, complexing agents and enzymes, or from bleach sequences in which metal salts are added in the bleach sequence.

9. The process of claim 1 wherein the effluent is subjected to a concentration treatment, prior to subjecting the effluent to the electrochemical membrane treatment, in order to reduce the volume of the effluent to at most about 60% of the original volume by the concentration treatment.

10. The process of claim 1 wherein the metal impurity salt solution withdrawn from the electrochemical device is treated with materials comprising at least one material selected from the group consisting of hydroxides, carbonates and sulfides, in order to precipitate and separate the metal impurity ions removed from the effluent fed in the electrochemical device.

11. The process of claim 10 wherein said metal impurity salt solution is treated with at least one material selected from the group consisting of white liquor, green liquor and lime sludge.

12. A method for purifying aqueous process effluent from pulp production processes from metal impurity cations which comprises purifying said effluent by an electrochemical membrane treatment in an electrochemical membrane device comprising a unit cell through which an electric current is passed between an anode side and a cathode side of said cell, said cell comprising at least two ion permeable membranes, forming between them at least one effluent compartment, wherein said cell comprises, counted in the direction from the cathode side of the cell towards the anode side, a first cation selective membrane and a second ion permeable membrane, said second membrane being a cation selective membrane or a non-ion selective porous polymeric membrane, wherein the effluent feed compartment is formed between said first and second membranes, wherein the process comprises feeding the effluent into the effluent feed compartment in said cell, purifying the effluent by removing with the electric current metal impurity cations from the effluent through a cation selective membrane on the cathode side of said compartment, withdrawing from said compartment the purified effluent, and feed a solution comprising cations into the formed compartment on the anode side of the effluent feed compartment, transporting the cations by the electric current through the second membrane as a substitute for the metal impurity cations removed from the effluent in the effluent feed compartment.

* * * * *